United States Patent
Payment

(10) Patent No.: US 11,334,516 B2
(45) Date of Patent: May 17, 2022

(54) USB TO SYNCHRONOUS SERIAL INTERFACE WITH EXTERNAL CLOCK SIGNAL

(71) Applicant: Venturi, LLC, Huntsville, AL (US)

(72) Inventor: Benjamin Victor Payment, Huntsville, AL (US)

(73) Assignee: Venturi, LLC, Huntsville, AL (US)

( * ) Notice: Subject to any disclaimer, the term of this patent is extended or adjusted under 35 U.S.C. 154(b) by 0 days.

(21) Appl. No.: 16/927,014

(22) Filed: Jul. 13, 2020

(65) Prior Publication Data

US 2020/0341935 A1    Oct. 29, 2020

Related U.S. Application Data

(63) Continuation of application No. 16/025,161, filed on Jul. 2, 2018, now Pat. No. 10,713,207.

(51) Int. Cl.
  *G06F 13/12*    (2006.01)
  *G06F 13/42*    (2006.01)
  *G06F 1/10*    (2006.01)

(52) U.S. Cl.
  CPC ............ *G06F 13/4282* (2013.01); *G06F 1/10* (2013.01); *G06F 2213/0042* (2013.01)

(58) Field of Classification Search
  CPC ............... G06F 13/382; G06F 13/4022; G06F 13/4027; G06F 13/4072
  USPC ........................................................ 710/105
  See application file for complete search history.

(56) References Cited

U.S. PATENT DOCUMENTS

| | | | | |
|---|---|---|---|---|
| 5,852,406 A | * | 12/1998 | Edde | G06F 13/387 340/4.2 |
| 6,370,603 B1 | * | 4/2002 | Silverman | G06F 13/385 709/220 |
| 2012/0054389 A1 | * | 3/2012 | Lee | G06F 13/4036 710/106 |
| 2012/0131220 A1 | * | 5/2012 | Broding | H04L 12/46 709/232 |
| 2012/0144086 A1 | * | 6/2012 | Lai | G06F 13/4291 710/313 |
| 2013/0158692 A1 | * | 6/2013 | Jensen | G06F 17/00 700/94 |

(Continued)

*Primary Examiner* — Titus Wong
(74) *Attorney, Agent, or Firm* — Angela Holt; Bradley Arant Boult Cummings LLP

(57) ABSTRACT

This disclosure relates generally to systems and methods of translating between Universal Serial Bus (USB) and synchronous serial protocols. In one embodiment, an apparatus includes an application-specific integrated circuit (ASIC) configured to operate in a multi-protocol generic mode and in an adaptive clock mode. The ASIC is configured to implement a multi-protocol generic command processor in the multi-protocol generic mode where the ASIC is operable to be commanded so as to execute a generic bus command that converts between the USB protocol and any commanded synchronous serial protocol. Furthermore, the ASIC can synchronize the execution of the generic bus command with an externally generated clock signal on the synchronous serial side when the ASIC is also provided in the adaptive clock mode. In this manner, a computer device with a USB port can use the ASIC as a bridge for data communications with a radio having a synchronous serial port.

19 Claims, 3 Drawing Sheets

(56) References Cited

U.S. PATENT DOCUMENTS

2015/0067188 A1\* 3/2015 Chakhaiyar ............. H04L 69/18
  709/232
2015/0074306 A1\* 3/2015 Ayyagari ............ G06F 13/4072
  710/110

\* cited by examiner

USB TO SYNCHRONOUS SERIAL INTERFACE WITH EXTERNAL CLOCK SIGNAL

REFERENCE TO RELATED APPLICATIONS

This application is a continuation of and claims priority to U.S. patent application Ser. No. 16/025,161, filed Jul. 2, 2018, which is incorporated herein by reference.

GOVERNMENT LICENSE RIGHTS

This invention was made with government support under Contract Number GS00Q14OADU329, Task Order 47QFSA18P0001 awarded by the Federal Acquisition Service. The government has certain rights in the invention.

FIELD OF THE DISCLOSURE

This disclosure relates generally to system and methods for translating between bus protocols.

BACKGROUND

Radios, such as combat radios, and other devices provide data communications to external devices using synchronous serial protocols where an external clock is provided to synchronize data communications. Typically, various layers of devices are needed to perform the translation between the synchronous serial protocol of the radio and a Universal Serial Bus (USB) protocol used by most modern computer devices. For instance, to translate to and from the USB protocol and a synchronous serial protocol, such as RS-232, an 8252 Synch, a microprocessor, and a USB to Universal Asynchronous Receiver Transmitter (UART) translator are needed. Furthermore, the microprocessor requires specialized software to perform the translation between synchronous and asynchronous. These layers of translation and the use of the microprocessor make conventional translation techniques awkward and costly. Typically, all of these layers of devices require dedicated Peripheral Component Interconnect (PCI) cards. While these cards exist, these PCI cards are expensive, because very few companies make them and because asynchronous protocols are now nearly ubiquitous when communicating with a computer device. Thus, what are needed are cheaper and more universal ways of translating between the USB protocol and a synchronous serial protocol.

SUMMARY

This disclosure relates generally to systems and methods of translating between Universal Serial Bus (USB) and synchronous serial protocols. In one embodiment, an apparatus includes an application-specific integrated circuit (ASIC) and a computer device. The computer device is configured to communicate with the ASIC in accordance with the USB protocol. The ASIC is configurable in a multi-protocol generic mode and in an adaptive clock mode. More specifically, the ASIC is configured to implement a multi-protocol generic command processor in the multi-protocol generic mode where the ASIC is operable to be commanded so as to execute a generic bus command that converts between the USB protocol and any commanded synchronous serial protocol. The ASIC can be commanded to operate in accordance with a specific synchronous serial protocol in the multi-protocol generic mode by transmitting commands that set communication parameters (e.g., baud rate, clock edge, bit order) of the ASIC based on the requirements of the specific synchronous serial protocol. As explained below, by also providing the ASIC in the adaptive clock mode, the ASIC can synchronize the execution of the generic bus command with an externally generated clock signal on the synchronous serial side.

The computer device is configured to set the ASIC to operate in the multi-protocol generic mode and in the adaptive clock mode, and to issue the generic bus command to the ASIC when the ASIC has been set to operate in the multi-protocol generic mode and in the adaptive clock mode. By using the ASIC as a bridge, the computer device with a USB port can communicate with a radio having a synchronous serial port. In this manner, data communications can be provided between the USB protocol and the synchronous serial protocol without needing a microprocessor to perform the asynchronous to synchronous translation and without requiring various layers of translation devices.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

This disclosure relates generally to systems and methods of translating between Universal Serial Bus (USB) and synchronous serial protocols. In this manner, computer devices, which utilize USB protocols, and radios, which generally use synchronous serial protocols, can transfer data between one another. Unlike previously known solutions, various layers of translations are not needed to translate between the USB protocol and the synchronous serial protocols. Furthermore, a microprocessor, a field programmable gate array (FPGA), a programmable logic controller (PLC), or other programmable device does not perform the translation between synchronous serial protocols and USB protocols. Instead, an apparatus includes an application-specific integrated circuit (ASIC) that is configurable in a multi-protocol generic mode and in an adaptive clock mode to perform the translation. The ASIC is configured to implement a multi-protocol generic command processor in the multi-protocol generic mode where the ASIC is operable so as to execute a generic bus command that convert between the USB protocol and any commanded synchronous serial protocol. The ASIC can be commanded to operate in accordance with a specific synchronous serial protocol in the multi-protocol generic mode by providing commands that set the communication parameters (e.g., baud rate, clock edge, bit order) of the ASIC based on the requirements of the specific synchronous serial protocol. As explained below, by also providing the ASIC in the adaptive clock mode, the ASIC can synchronize the execution of the generic bus command with an externally generated clock signal on the synchronous serial side. By using the ASIC as a bridge, a computer device with a USB port can communicate with a radio having a synchronous serial port.

Figure 1:
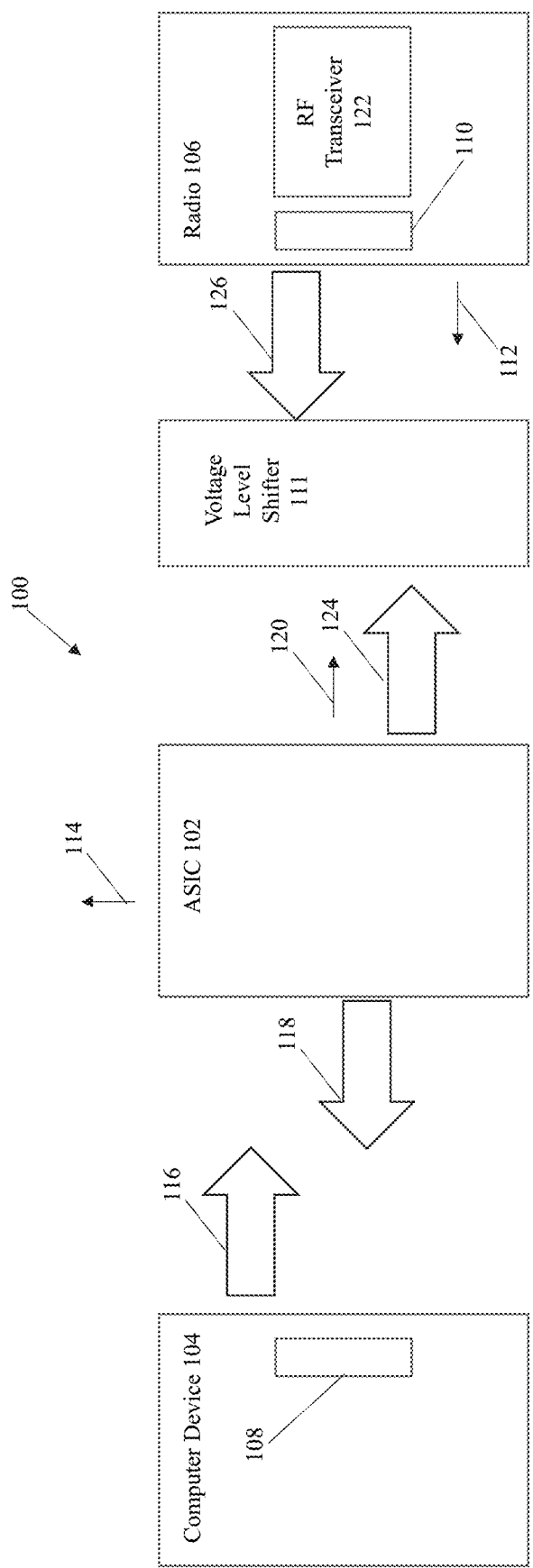
FIG. 1 illustrates one example of an apparatus that includes a computer device with a USB port, a radio with a synchronous serial port, and an ASIC that provides a communication bridge between the computer device and the radio.

FIG. 1 illustrates an exemplary apparatus 100 that allows for data communications to be exchanged between a USB protocol (which is asynchronous and packetized), and a synchronous serial protocol. The exemplary apparatus 100 however does not utilize software implemented on a general-purpose processor(s), FPGAs, or PLCs to perform the translation between asynchronous communications and synchronous communications. Furthermore, the apparatus 100 does not require intermediary systems that translate into intermediary protocols in order to achieve the translation between the USB protocol and the synchronous serial protocol.

Instead, as shown in FIG. 1, the exemplary apparatus 100 includes an ASIC 102 that acts as a direct protocol bridge between devices that perform data transfers in accordance with the USB protocol and devices that perform data transfers in accordance to a synchronous serial protocol. The ASIC 102 is a sub-apparatus of the apparatus 100. Additionally, the apparatus 100 includes two other sub-apparatuses, which are the computer device 104 and the radio frequency (RF) radio 106.

As shown in FIG. 1, the computer device 104 includes a USB port 108. The computer device 104 is configured to communicate with other external devices in accordance to the USB protocol. In particular, the computer device 104 is configured to modulate data for transmission and demodulate received data formatted in accordance with the USB protocol. The computer device 104 is configured to transmit and receive this data formatted in accordance with the USB protocol through the USB port 108. As is known in the art, differential data signals are transmitted through the USB port 108 to provide data communications in accordance with the USB protocol. Furthermore, data communications are packetized in the USB protocol and are asynchronous. Thus, data packets are transmitted having a predetermined sequence of voltage states to indicate the start and the end of the data packet. As explained in further detail below, the computer device 104 is also configured to coordinate the operation of the ASIC 102 when performing message conversions between the USB protocol and the synchronous serial protocol. The ASIC 102 may be connected to the USB port 108 with a USB cable that is connected between the ASIC 102 and the USB port 108. An intermediary USB port may be connected between the USB cable and/or a printed circuit board may provide the connections between the USB cable and the ASIC 102. These and other techniques for connecting the ASIC 102 to the computer device 104 would be apparent to one of ordinary skill in the art in light of this disclosure.

With regards to the radio 106, the radio 106 is the type of apparatus that would benefit significantly from the solution disclosed herein to communicate with the computer device 104. RF radios, like the radio 106, are inherently synchronous in that radio techniques for communication are inherently analog because wireless communication through the radio involves modifying an electromagnetic RF carrier wave with an analog representation of the information. Even wireless digital communications are performed in this manner because discreet pulses are modulated onto an electromagnetic RF carrier wave. In essence, the radio operates by providing digital over an analog interface. Thus, typically one bit of data is clocked by the radio with each discrete set of vibrations on the RF spectrum. Accordingly, wireless radio communications on the radio are inherently harmonious with synchronous serial communications since each discrete set of vibrations of the RF spectrum can be mapped to one bit of clocked synchronous serial data. The synchronous serial data however needs to be clocked based on the timing provided by the radio 106.

However, previously known techniques for operating an ASIC are not able to directly provide a bridge between USB and synchronous serial communications because these ASICs are not designed to be slave devices but rather are master devices that generate their own clock signal and thus require that other devices be synchronized in accordance to the ASIC's internal clock signal. As a result, these ASICs do not inherently come capable of dealing with RF radios, like the RF radio 106. This disclosure provides a unique combination of two features of these ASICs to mimic the behavior of a slave device and thereby resolve the aforementioned problem, as explained in further detail below.

In this embodiment, the ASIC 102 is configurable in a multi-protocol generic mode and in an adaptive clock mode. The ASIC 102 may be operable in various modes that are non-generic as they are specifically tailored to allow the ASIC 102 to translate between USB and serial protocols such as I²C and JTAG protocols. However, the ASIC 102 can convert between USB and a plurality of different synchronous serial protocols in the multi-protocol generic mode. More specifically, the ASIC 102 is operable to be commanded so as to execute generic bus commands in the multi-protocol generic mode that are applicable to any synchronous serial protocol. These include generic write commands and generic read commands that convert data communications between the USB protocol and synchronous serial protocols. In order for the ASIC 102 to operate with a specific synchronous serial protocol in the multi-protocol generic mode, the ASIC 102 is commanded so as to operate in accordance with the idiosyncrasies of the selected synchronous serial protocol. For example, the ASIC 102 may be commanded to operate at a particular baud rate, to select a particular clock edge of operation, to assume a particular bit order, and to provide and accept certain specified bus control signals as specified by the particular synchronous serial protocol. The settings for these communication parameters may be provided as commands either during the translation operations or may have been previously provided and stored prior to the translation operations.

The ASIC 102 shown in FIG. 1 is configured to implement a multi-protocol generic command processor in the multi-protocol generic mode where the ASIC 102 is commandable to execute one or more generic bus commands that convert between a USB protocol and any one of a plurality of synchronous serial protocols in the multi-protocol generic mode. In this particular example, the ASIC 102 is operable so as to be commanded to communicate over a bus to external devices in accordance with the synchronous serial protocol implemented by the radio 106. Thus, the radio 106 includes a synchronous serial port 110 for communicating data in accordance with the synchronous serial protocol. The synchronous serial protocol may be any type of synchronous and serial protocol that can be used by the radio 106 to transfer bits over a bus to external devices. In some embodiments, the radio 106 may communicate over a bus in accordance with a Synchronous Peripheral Interface (SPI) protocol. In other embodiments, the radio 106 may communicate over a bus in accordance with a Synchronous Serial Interface (SSI) protocol.

In particular, the SSI protocol may be an RS-232 protocol and thus the synchronous serial port 110 may be an RS-232 port. Thus, one or more RS-232 cables may be used to connect the radio 106 to the ASIC 102. Single ended signals are used with the RS-232 protocols that allows for data transmission from one transmitter to one receiver at a clock oscillation rate of up to around 20 Kbits/second over short distances of up to 50 feet. Generally, RS-232 signals represent bit states using a maximum negative voltage magnitude and a maximum positive voltage magnitude relative to ground. However, the radio 106 and the ASIC 102 may operate at different maximum voltage magnitudes. Accordingly, a voltage level shifter 111 may be provided between the ASIC 102 and the radio 106 to convert synchronous serial signals between voltage domains.

To provide a bridge between the computer device 104 and the radio 106, the ASIC 102 is furthermore provided in the adaptive clock mode. Generally, ASICs with adaptive clock modes are used to adjust the oscillation of the ASIC's internally generated clock signal so that the oscillation period is adjusted for certain protocols that require clock signals with varying oscillations periods. For example, adaptive clocking is often used as a means of synchronizing the generation of the ASIC's internally generated clock to the requirements of some target microcontrollers (e.g., JTAG microcontrollers that sometimes require that the clock oscillation period be divided by certain integers). To adjust the clock oscillation period, the ASIC would generally receive some externally generated variable reference signal.

In this embodiment however, the radio 106 is configured to generate and transmit a clock signal 112 to the ASIC 102 as the externally generated variable reference signal. This causes the ASIC 102 to generate an internally generated clock signal 114 in accordance with the oscillation rate of the clock signal 112 from the radio 106. While the internally generated clock signal 114 is not provided to the radio 106, data communications to and from the ASIC 102 will be synchronized in accordance with the clock signal 112, which is exogenous to the ASIC 102. Accordingly, the ASIC 102 is configured to generate the internally generated clock signal 114 but the ASIC 102 is configured to synchronize the internally generated clock signal 114 in accordance with the externally generated clock signal 112 from the radio 106 in the adaptive clock mode. This synchronizes the execution of a generic bus command with the internally generated clock signal 114 so that the ASIC 102 thereby synchronizes the execution of the generic bus command in accordance with the externally generated clock signal 112. In this manner, the ASIC 102 mimics the operation of a slave device and thus can be used to provide a bridge between the computer device 104 and the radio 106. Accordingly, the ASIC 102 is configured to synchronize the execution of a generic bus command with an externally generated clock signal 112 when the generic bus command is being implemented in accordance with the commanded synchronous serial protocol (e.g., RS-232 protocol) for the radio 106.

While the radio 106 communicates with the ASIC 102 in accordance with the commanded synchronous serial protocol through the synchronous serial port 110, the computer device 104 is configured to communicate with the ASIC 102 in accordance with the USB protocol through the USB port 108. Furthermore, the computer device 104 is also configured to control the data transfer operations of the ASIC 102. Thus, the computer device 104 is configured to set the ASIC 102 to operate in the multi-protocol generic mode and in the adaptive clock mode simultaneously. The computer device 104 is also configured to issue a generic bus command to the ASIC 102 when the ASIC 102 has been set to operate in the multi-protocol generic mode and in the adaptive clock mode. In this manner, write operations for data to the radio 106 and read operations for data from the radio 106 can be executed through the ASIC 102, as explained in further detail below.

To issue bus commands, transfer data, and control the operation of the ASIC 116, the computer device 116 may be configured to generate a bus output 116 in accordance with the USB protocol through the USB port 108. The bus output 116 includes the differential USB signal used by the computer device 104 to communicate information through the USB port 108. The bus output 116 will be a bus input to the ASIC 102. Furthermore, the ASIC 102 may be configured to generate a bus output 118 in accordance with the USB protocol to transfer data to the computer device 104 through the USB port 108.

In some embodiments, the ASIC 102 includes a plurality of channels (discussed in further detail below). Each of these channels may be operated in different modes, such as the multi-protocol generic mode and a bit-bang mode where the computer device 104 controls the bit states directly, as explained in further detail below. To execute a generic write command, the computer device 104 may be configured to assign a first channel of the ASIC 102 to operate in the multi-protocol generic mode. The computer device 104 may then transmit a generic write command that includes a data payload to the ASIC 102, which may be received by the ASIC 102 on the first channel. The generic write command is formatted in accordance with the USB protocol. Thus, the generic write command may include a header, a write command identifier, the data payload, a write address, and/or other types of information relevant to the generic write command.

The computer device 104 may also assign a second channel of the ASIC 102 to operate in the bit-bang mode. The computer device 104 can thus use this channel to control the required bus control signals needed so that the ASIC can communicate with the radio 106. For instance, the ASIC 102 may be commanded to operate in accordance with an RS-232 protocol, with various handshaking signals associated with the different write and read commands being implemented through the second channel. The ASIC 102 may be operating in the multi-protocol generic mode and may not have any specific hardware specifically designed with the handshaking signals of the RS-232 protocol. The second channel in the bit-bang mode however may be operated by the computer device 104 to provide and receive the required handshaking signals for the RS-232 protocol.

In one example, the computer device 104 may generate the bus output 116 such that the bus output 116 transmits a generic write command with a data payload to the ASIC 102. Furthermore, the computer device 116 may instruct the ASIC 102 to transmit a Request to Send signal in the write initiation state (i.e., either a logical "1" or a logical "0" depending on which logical state indicates that a write command is to be executed) through the second channel in response to transmitting the generic write command. The ASIC 102 is configured to transmit a Request to Send signal 120 to the radio 106 in the write initiation state through the second channel in response to the instruction by the computer device 104.

The radio 106 includes an RF transceiver 122 that is configured to control the emission and reception of wireless RF signals for the transmission and reception of data wirelessly. The RF transceiver 122 of the radio 106 may receive the Request to Send signal 120 in the write initiation state from the second channel of the ASIC 102. So long as the ASIC 102 is clear to send, the radio 106 is configured to generate and transmit the clock signal 112 to the ASIC 102. In response, the ASIC 102 is configured to generate and transmit a bus output 124. More specifically, the ASIC 102 is configured to execute the generic write command by transmitting the bus output 124 with the data payload in accordance with the commanded synchronous serial protocol (e.g., RS-232 protocol) through the first channel in response to clock signal 112. The ASIC 102 synchronizes the transmission of the bus output 124 with the data payload in accordance with the externally generated clock signal 112 since the ASIC 102 is in the adaptive clock mode. The RF transceiver 122 of the radio 106 then receives the bus output 124 with the data payload through the synchronous serial port 110. The RF transceiver 122 modulates the data payload onto an RF carrier signal and transmits the modulated data payload on the RF carrier signal wirelessly (from one or more antennas) to another RF radio (not explicitly shown).

In another example, the radio 106 receives a wireless signal (on one or more antennas) from another radio (not shown). The RF transceiver 122 is configured to demodulate the wireless signal and obtain a data payload. To transmit the data payload to the ASIC 102, the RF transceiver 122 of the radio 106 is configured to generate the clock signal 112 and transmit the clock signal 112 to the ASIC 102. The RF transceiver 122 of the radio 106 is then configured to generate a bus output 126 with the data payload to the ASIC 102 in accordance with the synchronous serial protocol (e.g., RS-232 protocol) through the synchronous serial port 110 (e.g., RS-232 port). The transmission of the bus output 126 with the data payload is synchronized in accordance with the clock signal 112 by the RF transceiver 122.

The ASIC 102 is configured to receive the bus output 126 with the data payload, which is formatted in accordance with the commanded synchronous serial protocol (e.g., RS-232 protocol) and synchronized in accordance with the externally generated clock signal 112. The ASIC 102 may have buffer registers (explained in further detail below) and be configured to store the data payload in the buffer registers. The computer device 104 may continuously loop and request any information from the designated buffer registers with a read request. Thus, the computer device 104 may generate the bus output 116 as a read command in accordance with the USB protocol. The computer device 104 is configured to transmit this bus output 116 to the ASIC 102 through the USB port 108. In response to receiving the bus output 116 with the read command, the ASIC 102 is configured to read the received data payload in the buffer registers. The ASIC 102 is then configured to generate and transmit the bus output 118 with the read data payload to the computer device 104 in accordance with the USB protocol. In this manner, the computer device 104 can receive a data payload from the radio 106 with the ASIC 102 providing a bridge between the computer device 104 and the radio 106.

Figure 2:
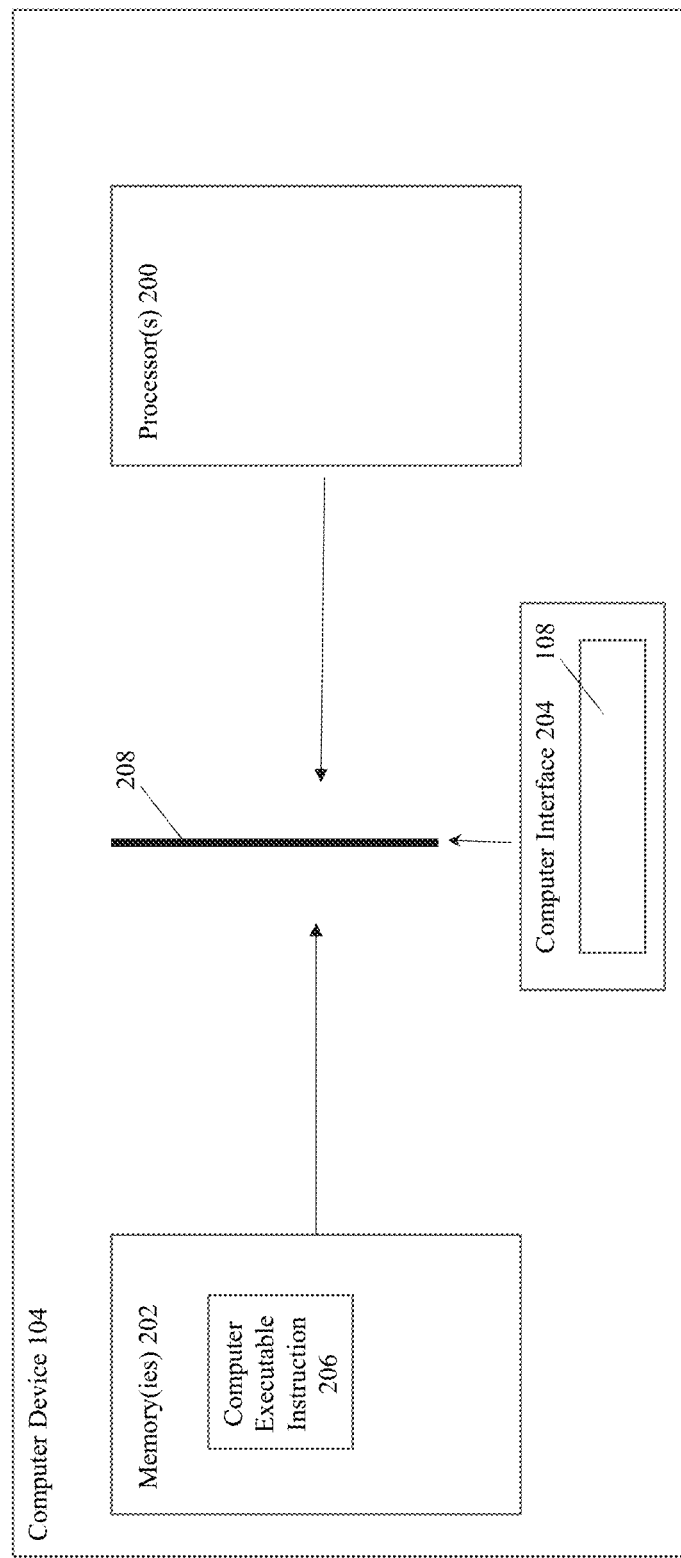
FIG. 2 illustrates one embodiment of the computer device shown in FIG. 1.

FIG. 2 illustrates one exemplary embodiment of the computer device 104. The computer device 104 may be any type of processor controlled device, such as, by way of example, personal computers, workstations, servers, clients, mini-computers, main-frame computers, laptop computers, smart phones, tablets, a network of one or more individual computers, mobile computers, portable computers, handheld computers, palm top computers, set top boxes for a TV, interactive televisions, interactive kiosks, personal digital assistants, interactive wireless devices, or any combination thereof.

As shown in FIG. 2, the computer device 104 includes one or more processor(s) 200, one or more memory(ies) 202, and a computer interface 204. Examples of processors 200 include any type of sequential state machine including microprocessors, graphics processing units (GPUs), central processing units (CPUs), digital signal processors (DSPs), reduced instruction set computing (RISC) processors, systems on a chip (SoC), baseband processors, and other suitable general purpose hardware configured to perform the various functionality described throughout this disclosure. Additionally, the computer device 104 may include one or more memories 202. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies to store electronic content such as programs and data.

In particular, the one or more memories 202 may store computer executable instructions 206 that, when executed by the one or more processors 200, cause the one or more processors 200 to operate as discussed above with regards to FIG. 1. The one or more processors 200 may be operably associated with the one or more memories 202 so that the computer executable instructions 206 can be provided to the one or more processors 200 for execution. For example, the one or more processors 200 may be operably associated to the one or more memories 202 through one or more buses 208. Furthermore, the computer device 104 may possess or may be operably associated with input devices (not explicitly shown) (e.g., a keyboard, a keypad, controller, a mouse, a microphone, a touch screen, a sensor) and output devices (not explicitly shown) such as (e.g., a computer screen, printer, or a speaker).

The computer device 104 may execute an appropriate operating system such as Linux, Unix, Microsoft® Windows®, Apple® MacOS®, IBM® OS/2®, Palm® OS, embedded operating systems such as Windows® CE, and/or the like. The computer device 104 may advantageously be equipped with a network communication device such as a network interface card, a modem, or other network connection device suitable for connecting to one or more networks.

In this embodiment, the computer device 104 includes a computer interface 204 that allows the computer device 104 to communicate with external devices such as the ASIC 102 shown in FIG. 1. Accordingly, the computer interface 204 includes the USB port 108, which may be connected to the ASIC 102 through a USB cable that is connected to the USB port 108. The computer interface 204 may or may not include other ports depending on the configuration of the computer device 104.

Figure 3:
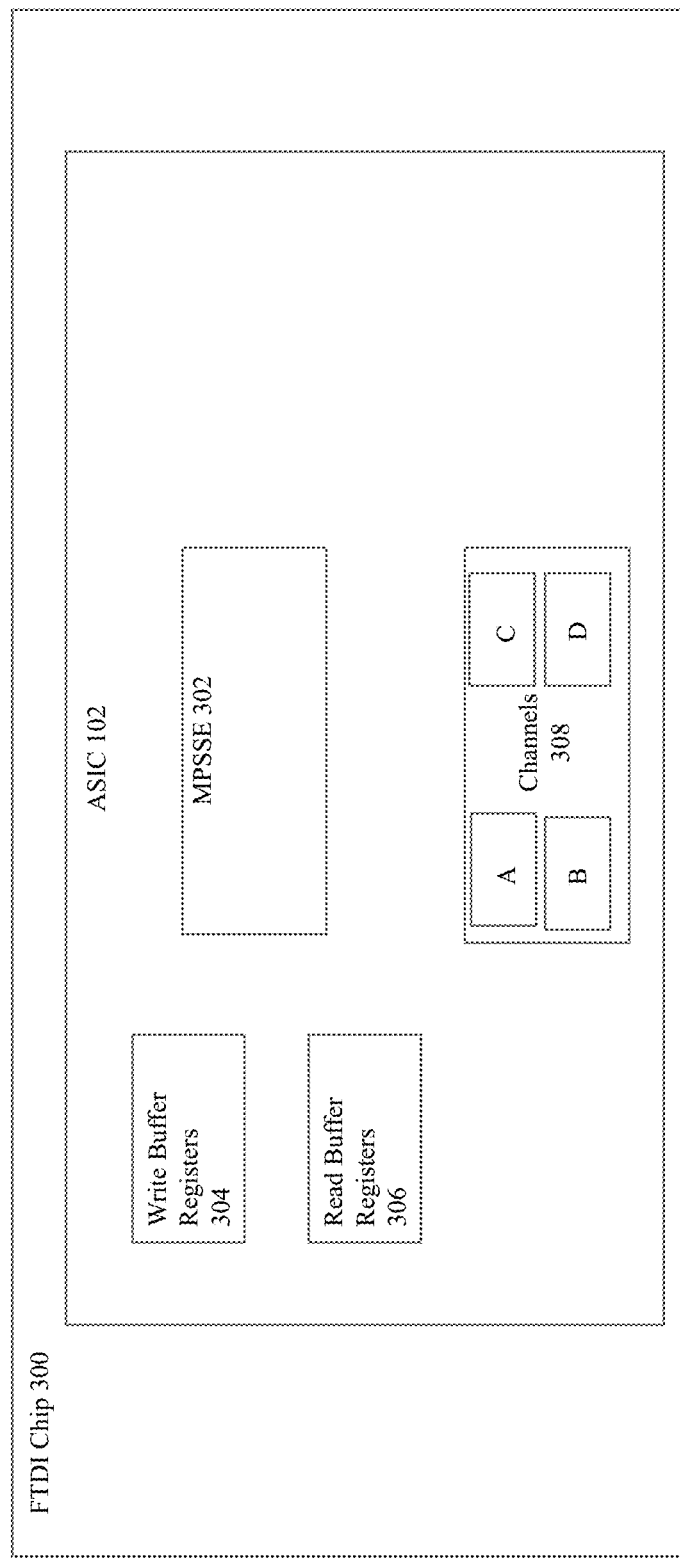
FIG. 3 illustrates one embodiment of the ASIC shown in FIG. 1.

FIG. 3 illustrates one exemplary embodiment of the ASIC 102. In this embodiment, the ASIC 102 is integrated into a Future Technology Devices International (FTDI) chip 300. Various FTDI chips provide chips that are capable of directly translating between synchronous serial protocols and the USB protocol. FTDI chips generally have specific hardware built into them to translate between the USB protocol and specific synchronous serial protocols such as I²C protocols, SPI protocols, and JTAG protocols. However, the FTDI chip 300 also includes an MPSSE 302. The MPSSE 302 is generic hardware found in the ASIC 102 that allows the FTDI chip 300 to be commanded to communicate with any one of several synchronous serial protocols and the USB protocol. This MPSSE 302 thus allows the ASIC 102 to execute the generic write commands and the generic read commands discussed above. For instance, the MPSSE 302 allows the FTDI chip 300 to be commanded to operate in accordance with SPI protocols or SSI protocols (e.g., RS-232 protocols). Accordingly, in this example, the multi-protocol generic mode is an MPSSE mode.

Some examples of the FTDI chip 300 that include the MPSSE 302 are the FT2232D, FT2232H, FT4232H and FT232H chips, which communicate with a personal computer (or an application processor) in accordance with the USB protocol. The computer device 104 (shown in FIG. 1 and FIG. 2) may communicate with the MPSSE 302 using the D2XX USB drivers. The LibMPSSE-SPI library may be used to aid in the implementation of SPI protocols using the FTDI chip 300, which incorporate the MPSSE 302 by taking care of required MPSSE commands.

As shown in FIG. 3, the ASIC 102 includes write buffer registers 304. The ASIC 102 uses the write buffer registers 304 to store a data payload received from the computer device 104. The ASIC 102 then reads the data payload from the write buffer registers 304 to execute a generic write command, as described above. Also, as described above, the ASIC 102 then transmits the data payload to the radio 106. Furthermore, as shown in FIG. 3, the ASIC 102 further includes read buffer registers 306. The ASIC 102 uses the read buffer registers 306 to store a data payload received from the radio 106. The ASIC 102 then reads the data payload from the read buffer registers 306 to execute a generic read command, as described above. Next, as described above, the ASIC 102 transmits the data payload to the computer device 104.

The ASIC 102 further includes various channels 308 that the ASIC 102 uses to transmit and receive the various bus outputs 116, 118, 124, 126, and individual signals, 112, 120 to and from the computer device 104 and the radio 106. Of course, the particular configuration of the channels 308 depend on which synchronous serial protocol the ASIC 102 is has been set up to communicate with. In this example, the ASIC 102 includes channels A, B, C, D as shown in FIG. 3. Below is a table that indicates the manner that the channels A, B, C, D are configured when the synchronous serial protocol is RS-232 and the FTDI chip 300 is an FT4232H chip. GPIOL3 is the clock signal 112, which is generated by the radio 106. It should be noted that different level shifters/voltage translators could allow for differential signals or other differential inputs as well as other synchronous serial protocols (e.g., RS-485 protocol).

| FT4232HL and FT4232HQ (64-pin) | | | | |
|---|---|---|---|---|
| | | MPSSE | Sync Serial | |
| Channel | A | | | |
| 16 | ADBUS0 | TCK/SK | TX CLK OUT | |
| 17 | ADBUS1 | TDI/DO | TX | |
| 18 | ADBUS2 | TDO/DI | | |
| 19 | ADBUS3 | TMS/CS | | |
| 21 | ADBUS4 | GPIOL0 | | |
| 22 | ADBUS5 | GPIOL1 | | |
| 23 | ADBUS6 | GPIOL2 | | |
| 24 | ADBUS7 | GPIOL3 | TX CLK IN | |
| Channel | B | | | |
| 26 | BDBUS0 | TCK/SK | RX CLK OUT | |
| 27 | BDBUS1 | TDI/DO | | |
| 28 | BDBUS2 | TDO/DI | RX | |
| 29 | BDBUS3 | TMS/CS | | |
| 30 | BDBUS4 | GPIOL0 | | |
| 32 | BDBUS5 | GPIOL1 | | |
| 33 | BDBUS6 | GPIOL2 | | |
| 34 | BDBUS7 | GPIOL3 | RX CLK IN | |
| Channel | C | | | |
| 38 | CDBUS0 | RS232/Bit-Bang | TX | Asynchronous Serial Console Transmit |
| 39 | CDBUS1 | RS232/Bit-Bang | RX | Asynchronous Serial Console Receive |
| 40 | CDBUS2 | RS232/Bit-Bang | | |
| 41 | CDBUS3 | RS232/Bit-Bang | | |
| 43 | CDBUS4 | RS232/Bit-Bang | | |

-continued

| FT4232HL and FT4232HQ (64-pin) | | | | |
|---|---|---|---|---|
| | | MPSSE | Sync Serial | |
| 44 | CDBUS5 | RS232/ Bit-Bang | | |
| 45 | CDBUS6 | RS232/ Bit-Bang | | |
| 46 | CDBUS7 | RS232/ Bit-Bang | | |
| Channel | D | | | |
| 48 | DDBUS0 | RS232/ Bit-Bang | RTS | Request to Send |
| 52 | DDBUS1 | RS232/ Bit-Bang | CTS | Clear to Send |
| 53 | DDBUS2 | RS232/ Bit-Bang | DSR | Data Set Ready |
| 54 | DDBUS3 | RS232/ Bit-Bang | DCD | Data Carrier Ready |
| 55 | DDBUS4 | RS232/ Bit-Bang | DTR | Data Terminal Ready |
| 57 | DDBUS5 | RS232/ Bit-Bang | RI | Ring Indicate |
| 58 | DDBUS6 | RS232/ Bit-Bang | GPIO | General Purpose Input/Output |
| 59 | DDBUS7 | RS232/ Bit-Bang | GPIO | General Purpose Input/Output |

Note that for the generic write command, two channels (e.g., channel A and channel D) are needed because the ASIC 102 needs to handle handshaking signals. For the generic read command, the ASIC 102 only uses one channel (e.g., channel B) because the computer device 104 on the USB side is not the originator of the communication. At least two channels would also allow the ASIC 102 to provide full duplex for certain synchronous serial protocols. Conventionally, for the RS-232 protocol, the radio 106 cannot fully duplex because both transmission and receive communications share the same frequency band. As such, receive and transmission require time duplexing during different time periods. However, some synchronous serial interfaces for radios transmit and receive in different frequency bands and thus can be fully duplexed. For these synchronous serial protocols, the ASIC 102 could provide full duplexing from two different channels 308.

Those skilled in the art will recognize improvements and modification to the preferred embodiments of the present disclosure. All such improvements and modifications are considered within the scope of the concepts disclosed herein and the claims that follow.

What is claimed is:

1. A method, comprising:
setting an application-specific integrated circuit (ASIC) to operate in a multi-protocol generic mode and an adaptive clock mode;
issuing a generic bus command in accordance with a Universal Serial Bus (USB) protocol;
setting the ASIC to receive an externally generated clock signal from a radio;
executing the generic bus command through the ASIC with the radio in accordance with a one of a plurality of synchronous serial protocols in which the radio operates so that the execution of the generic bus command is synchronized with the externally generated clock signal from the radio;
generating an internally generated clock signal with the ASIC;
synchronizing the internally generated clock signal in accordance with the externally generated clock signal in an adaptive clock mode; and
synchronizing the execution of the generic bus command with the internally generated clock signal so that the ASIC thereby synchronizes the execution of the generic bus command in accordance with the externally generated clock signal.

2. The method of claim 1, further comprising communicating with the ASIC in accordance with the USB protocol through a USB port wherein the ASIC is configured to communicate in accordance to the one of the plurality of synchronous serial protocols through a synchronous serial port.

3. The method of claim 1, wherein the ASIC further comprises a plurality of channels, wherein the generic bus command is a generic write command that includes a data payload, wherein the generic write command is formatted in accordance with the USB protocol, and wherein the method further comprises:
assigning a first channel of the plurality of channels for operating in the multi-protocol generic mode;
assigning a second channel of the plurality of channels for operating in a bit-bang mode;
transmitting the generic write command with the data payload to the ASIC; and
instructing the ASIC to transmit a Request to Send signal in a write initiation state through the second channel in response to transmitting the generic write command.

4. The method of claim 3, further comprising:
executing the generic write command with the ASIC by transmitting the data payload in accordance with the one of the synchronous serial protocols through the first channel in response to transmitting the Request to Send in the write initiation state; and
synchronizing the transmission of the data payload with the ASIC in accordance with the externally generated clock signal.

5. The method of claim 4, further comprising:
receiving the Request to Send signal in the write initiation state from the second channel at a Radio Frequency (RF) transceiver;
generating the externally generated clock signal with the RF transceiver in response to receiving the Request to Send signal in the write initiation state;
transmitting the externally generated clock signal from the RF transceiver to the ASIC; and
receiving the data payload at the RF transceiver from the ASIC in accordance with the one of the plurality of the synchronous serial protocols.

6. The method of claim 1, wherein the ASIC includes buffer registers, wherein the generic bus command is a generic read command and wherein the method further comprises:
receiving a data payload from a Radio Frequency (RF) transceiver at the ASIC in accordance with the one of the plurality of the synchronous serial protocols and synchronized in accordance with the externally generated clock signal;
storing the received data payload in the buffer registers of the ASIC;
reading the received data payload in the buffer registers; and
receiving the read data payload from the ASIC in accordance with the USB protocol in response to the generic read command.

7. The method of claim 6, further comprising:
generating the externally generated clock signal at the RF transceiver;
transmitting the externally generated clock signal from the RF transceiver to the ASIC; and
transmitting a data payload from the RF transceiver to the ASIC in accordance with the one of the plurality of synchronous serial protocols and synchronized in accordance with the externally generated clock signal.

8. The method of claim 1, wherein the one of the plurality of synchronous serial protocols is a synchronous serial interface (SSI) protocol.

9. The method of claim 1, wherein the one of the plurality of synchronous serial protocols is a synchronous peripheral interface (SPI) protocol.

10. The method of claim 1, wherein:
the ASIC is integrated into a Future Technology Devices International (FTDI) chip; and
the ASIC includes a multi-protocol synchronous serial engine (MPSSE) such that the multi-protocol generic mode is an MPSSE mode.

11. A method, comprising:
implementing a multi-protocol generic command processor in a multi-protocol generic mode with an application-specific integrated circuit (ASIC) where the ASIC is operable to be commanded so as to execute a generic bus command that converts between a USB protocol and any one of a plurality of synchronous serial protocols in the multi-protocol generic mode;
executing the generic bus command with the ASIC to communicate a data payload between a Universal Serial Bus (USB) port and a synchronous serial port by converting between the USB protocol and one of a plurality of synchronous serial protocols;
synchronizing the ASIC to execute the generic bus command with an externally generated clock signal when the generic bus command is being implemented in accordance with the one of the plurality of synchronous serial protocols
generating an internally generated clock signal with the ASIC;
synchronizing the internally generated clock signal in accordance with the externally generated clock signal with the ASIC in an adaptive clock mode; and
synchronizing the execution of the generic bus command with the internally generated clock signal so that the ASIC thereby synchronizes the execution of the generic bus command in accordance with the externally generated clock signal.

12. The method of claim 11, further comprising:
communicating in accordance to the one of the plurality of synchronous serial protocols though the synchronous serial port; and
communicating with a computer device in accordance with the USB protocol through the USB port.

13. The method of claim 11, wherein the ASIC further comprises a plurality of channels, wherein the generic bus command is a generic write command that includes the data payload, wherein the generic write command is formatted in accordance with the USB protocol, and the method further comprises:
setting a first channel of the plurality of channels for operating in the multi-protocol generic mode;
setting a second channel of the plurality of channels for operating in a bit-bang mode;
receiving the generic write command with the data payload at the ASIC; and
generating a Request to Send signal in a write initiation state through the second channel in response to transmitting the generic write command.

14. The method of claim 13, further comprising:
transmitting the Request to Send signal in the write initiation state through the second channel in response being instructed by a computer device;
executing the generic write command by transmitting the data payload in accordance with the one of the synchronous serial protocols through the first channel in response to transmitting the Request to Send in the write initiation state; and
synchronizing the transmission of the data payload in accordance with the externally generated clock signal.

15. The method of claim 14, wherein the ASIC includes buffer registers, wherein the generic bus command is a generic read command and wherein the ASIC is configured to:
receiving a data payload in accordance with the one of the plurality of the synchronous serial protocols and synchronized in accordance with the externally generated clock signal;
storing the received data payload in the buffer registers;
reading the received data payload in the buffer registers; and
transmitting the read data payload to the computer device in accordance with the USB protocol in response to the generic read command.

16. The method of claim 11, wherein the one of the plurality of synchronous serial protocols is a synchronous serial interface (SSI) protocol.

17. The method of claim 11, wherein the one of the plurality of synchronous serial protocols is a synchronous peripheral interface (SPI) protocol.

18. The method of claim 11, wherein:
the ASIC is integrated into a Future Technology Devices International (FTDI) chip;

the ASIC includes a multi-protocol synchronous serial engine (MPSSE) such that the multi-protocol generic mode is an MPSSE mode.

19. The method of claim 11, wherein the ASIC further comprises a plurality of channels, wherein the generic bus command is a generic write command that includes the data payload, wherein the generic write command is formatted in accordance with the USB protocol, and further comprising setting a channel of the plurality of channels for operating in the multi-protocol generic mode, with automatic handshaking and flow control enabled.

* * * * *